(12) United States Patent
Guyer et al.

(10) Patent No.: US 10,853,280 B1
(45) Date of Patent: Dec. 1, 2020

(54) STORAGE ENGINE HAVING COMPUTE NODES WITH REDUNDANT FABRIC ACCESS

(71) Applicant: EMC IP HOLDING COMPANY LLC, Hopkinton, MA (US)

(72) Inventors: James Guyer, Northboro, MA (US); Jason Duquette, Milford, MA (US); Alesia Tringale, Worcester, MA (US); Julie Zhivich, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/691,842

(22) Filed: Nov. 22, 2019

(51) Int. Cl.
*G06F 13/16* (2006.01)
*G06F 13/40* (2006.01)
*G06F 13/42* (2006.01)
*G06F 11/20* (2006.01)

(52) U.S. Cl.
CPC ...... *G06F 13/1684* (2013.01); *G06F 11/2002* (2013.01); *G06F 11/2053* (2013.01); *G06F 13/4022* (2013.01); *G06F 13/4282* (2013.01); *G06F 2213/0026* (2013.01)

(58) Field of Classification Search
CPC ............. G06F 13/1668; G06F 13/1684; G06F 13/4004; G06F 13/4022; G06F 13/4027; G06F 13/4265; G06F 13/4282; G06F 11/1423; G06F 11/1425; G06F 11/2002; G06F 11/2005; G06F 11/2007; G06F 11/201; G06F 11/2053; H04L 12/40169; H04L 12/40176; H04L 12/40182; H04L 12/40189; H04L 12/40195

See application file for complete search history.

(56) References Cited

U.S. PATENT DOCUMENTS

| | | | | |
|---|---|---|---|---|
| 5,269,011 | A | * 12/1993 | Yanai | G06F 15/17 703/24 |
| 9,864,710 | B2 | * 1/2018 | Davis | G06F 13/4221 |
| 9,910,753 | B1 | * 3/2018 | Tringale | G06F 11/3006 |
| 10,146,696 | B1 | * 12/2018 | Krigovski | G06F 12/1009 |
| 10,430,220 | B1 | * 10/2019 | Chalmer | G06F 9/45558 |
| 10,459,806 | B1 | * 10/2019 | He | G06F 11/2097 |
| 2006/0259712 | A1 | * 11/2006 | Onabe | G06F 3/0635 711/154 |
| 2007/0139423 | A1 | * 6/2007 | Kong | G09G 5/363 345/502 |
| 2012/0185643 | A1 | * 7/2012 | Dekoning | G06F 3/067 711/114 |

(Continued)

*Primary Examiner* — Thomas J. Cleary
(74) *Attorney, Agent, or Firm* — Anderson Gorecki LLP

(57) ABSTRACT

A storage system includes a storage engine having a first compute node, a second compute node, a first fabric adapter, and a second fabric adapter, the first compute node having a first memory and the second compute node having a second memory. The first compute node is connected to both the first and second fabric adapters, and the second compute node is connected to both the second and first fabric adapters. Both fabric adapters are configured to perform atomic operations on a memory of its respective compute node, and each fabric adapter contains a multi-initiating module configured to enable both the first compute node and the second compute node to initiate memory access operations on its respective memory.

9 Claims, 12 Drawing Sheets

(56) References Cited

U.S. PATENT DOCUMENTS

| | | | |
|---|---|---|---|
| 2014/0059265 A1* | 2/2014 | Iyer | G06F 9/46 710/313 |
| 2014/0351507 A1* | 11/2014 | El-Batal | G06F 3/0658 711/114 |
| 2016/0162422 A1* | 6/2016 | Weber | G06F 12/0897 710/308 |
| 2019/0250930 A1* | 8/2019 | Erez | G06F 1/3296 |

* cited by examiner

STORAGE ENGINE HAVING COMPUTE NODES WITH REDUNDANT FABRIC ACCESS

BACKGROUND

This disclosure relates to computing systems and related devices and methods, and, more particularly, to a storage engine of a storage system having compute nodes with redundant fabric access.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system includes a storage engine having a first compute node, a second compute node, a first fabric adapter, and a second fabric adapter, the first compute node having a first memory and the second compute node having a second memory. The first compute node is connected to both the first and second fabric adapters, and the second compute node is connected to both the second and first fabric adapters. Both fabric adapters are configured to perform atomic operations on a memory of its respective compute node, and each fabric adapter contains a multi-initiating module configured to enable both the first compute node and the second compute node to initiate memory access operations on its respective memory.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
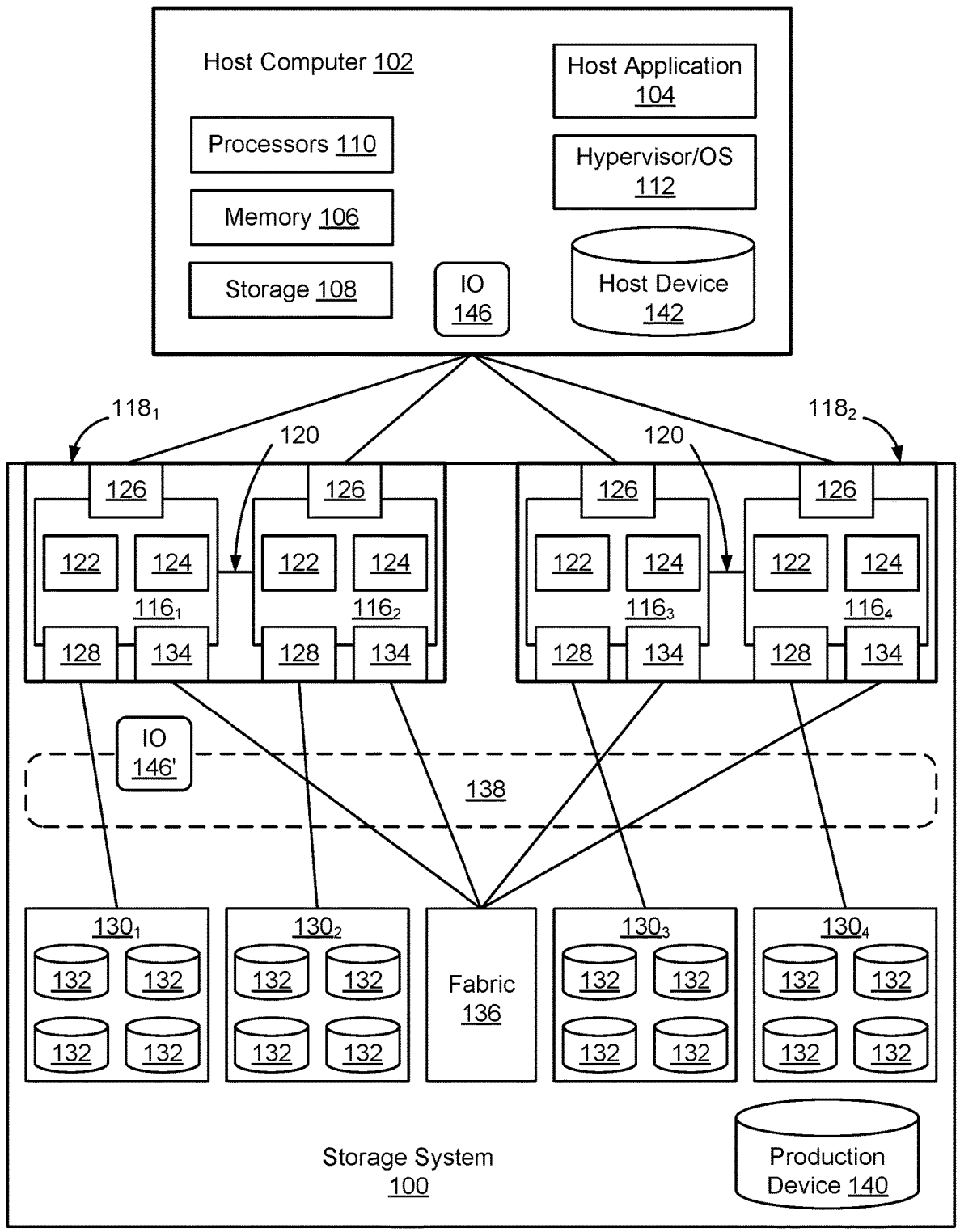
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (operating system) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be instantiated in a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more FEs (front end adapters) 126 for communicating with the host computer 102. Each compute node $116_1$-$116_4$ may also include one or more BEs (back end adapters) 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more CAs (channel adapters) 134 for communicating with other compute nodes 116 directly or via an interconnecting fabric 136. An example interconnecting fabric may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases. Logical storage devices are created and presented to the host application 104 for storage of the host application data. For example, a production device 140 and a corresponding host device 142 are created to enable the storage system 100 to provide storage services to the host application 104.

The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (input/output command) 146 from the host application 104 to the host device 142, the hypervisor/OS 112 determines whether the 10 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

Figure 2:
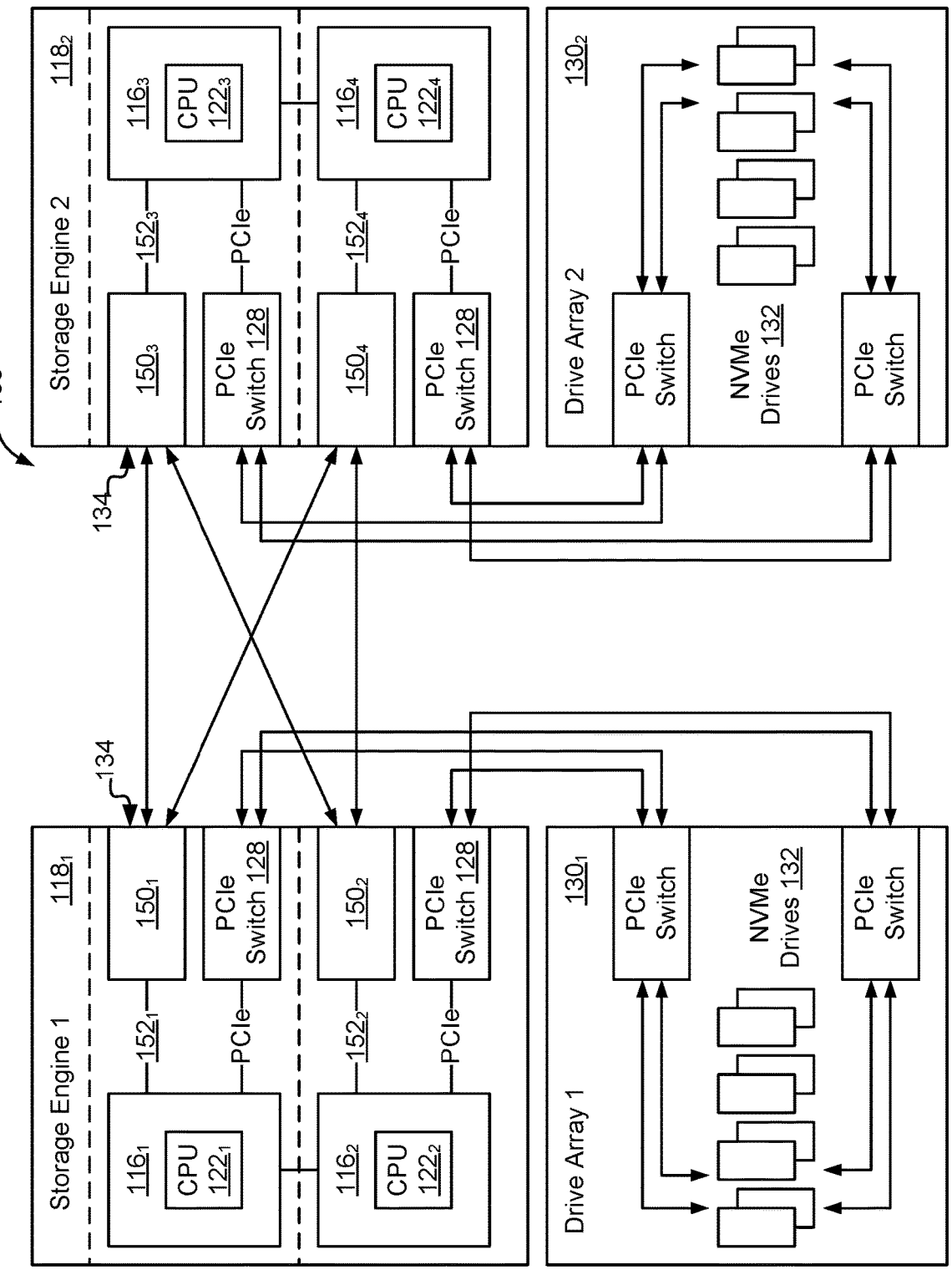
FIG. 2 is a functional block diagram of a storage system including two interconnected storage engines, each storage engine with a pair of compute nodes, in which each of the compute nodes in each of the storage engines has individualized fabric access.

FIG. 2 is a functional block diagram of a storage system including two interconnected storage engines, each storage engine with a pair of compute nodes, in which each of the compute nodes in each of the storage engines has individualized fabric access. FIG. 2 shows a storage engine $118_1$ having two compute nodes $116_1$ and $116_2$, in which each compute node 116 has individualized fabric access. As shown in FIG. 2, each compute node 116 has a dedicated host adapter 150, contained in a dedicated fabric access module (See FIG. 3), that the compute node 116 uses to access other storage engines 118. The host adapter may be directly connected to a host adapter 150 of another storage engine 118, or may be connected through fabric 136 to one or more other storage engines 118. For example, in FIG. 2, $CPU\ 122_1$ of compute node $116_1$ has an individualized connection $152_1$ to host adapter $150_1$, and uses that connection $152_1$ to access compute nodes $116_3$, $116_4$ of storage engine $118_2$. Likewise, $CPU\ 122_2$ of compute node $116_2$ has an individualized connection $152_2$ to host adapter $150_2$, and uses that connection $152_2$ to access compute nodes $116_3$, $116_4$ of storage engine $118_2$.

As shown in FIG. 2, each storage engine is also connected to one or more drive arrays 130 by back-end adapter 128. Back-end adapter 128 may be implemented, in some embodiments, as a PCIe switch that connects the compute node $116_1$ to one or more drive array 130 containing managed drives 132.

Figure 3:
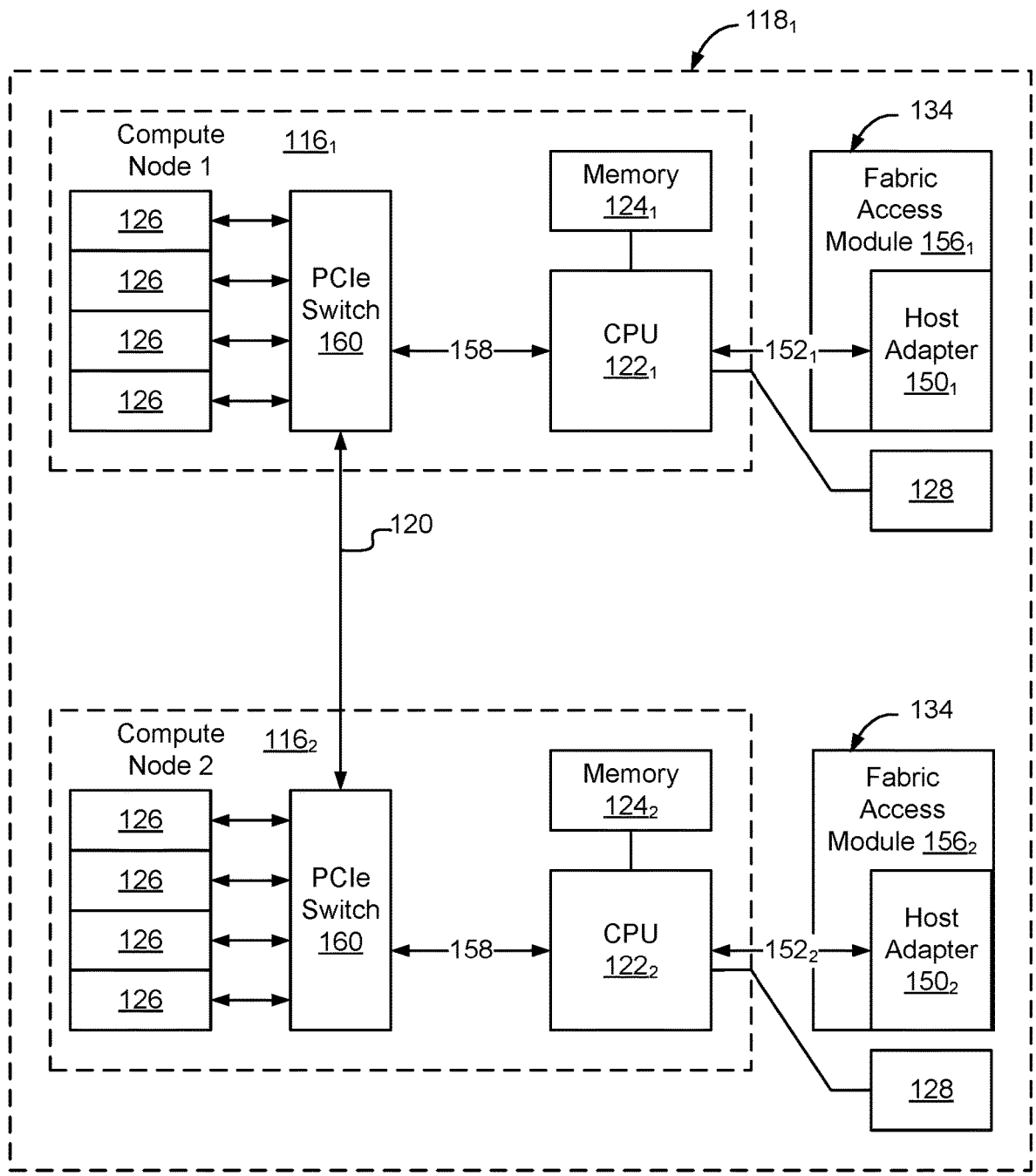
FIG. 3 is a functional block diagram of one of the storage engines of FIG. 2 in greater detail.

FIG. 3 shows one of the storage engines $118_1$ of FIG. 2 in greater detail. As shown in FIG. 3, each compute node 116 includes a CPU 122 and a set of front-end adapters 126. The CPU 122 and front-end adapters 126 may be interconnected, for example, using a PCIe switch 160. Local volatile memory 124 is connected to CPU 122. The $CPU\ 122_1$ of compute node $116_1$ also has an individualized connection $152_1$ to a dedicated fabric access module $156_1$ which includes host adapter $150_1$. Connection $152_1$, in some embodiments, is implemented using a PCIe bus. Compute node $116_2$ is similarly configured such that $CPU\ 122_2$ of compute node $116_2$ has an individualized connection $152_2$ to a dedicated fabric access module $156_2$ which includes host adapter $150_2$. Connection $152_2$, in some embodiments, is implemented using a PCIe bus.

Figure 4:
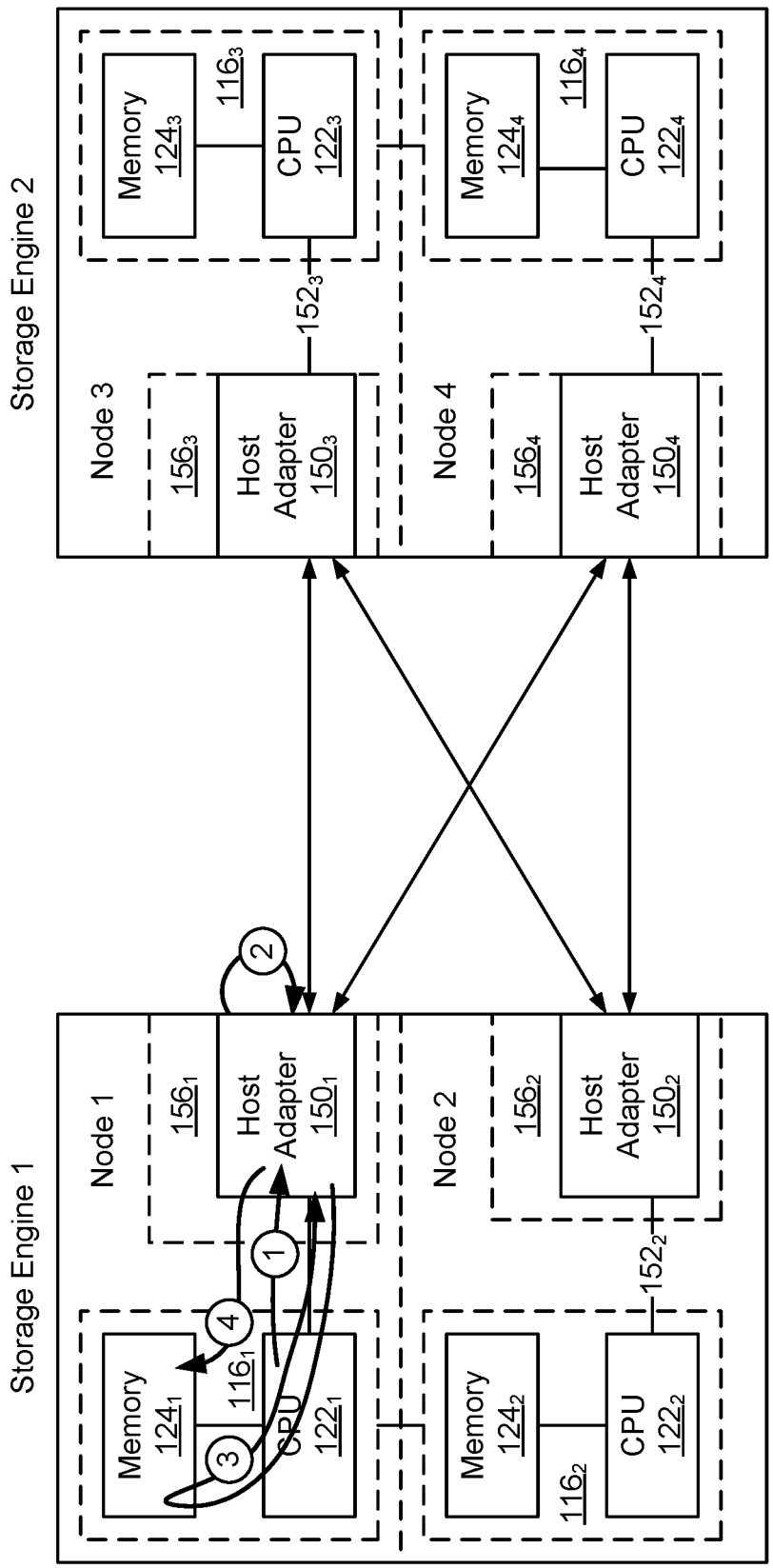
FIG. 4 is a functional block diagram of the two interconnected storage engines of FIG. 2, showing a memory access operation by node 1 of a first of the storage engines on its own local memory.
Figure 5:
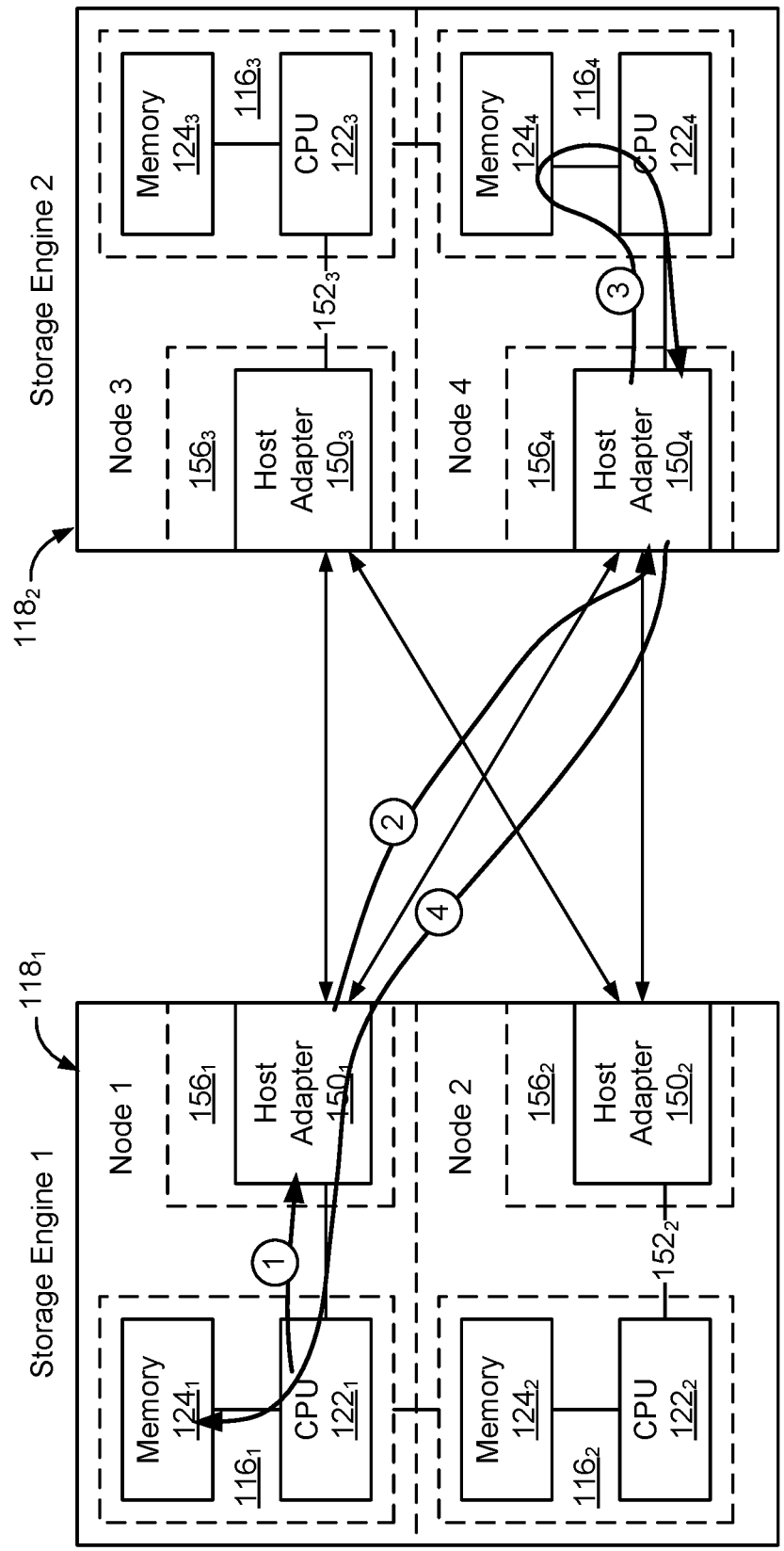
FIG. 5 is a functional block diagram of the two interconnected storage engines of FIG. 2, showing a memory access operation by node 1 of a first of the storage engines on a local memory of node 4 of a second of the storage engines.
Figure 6:
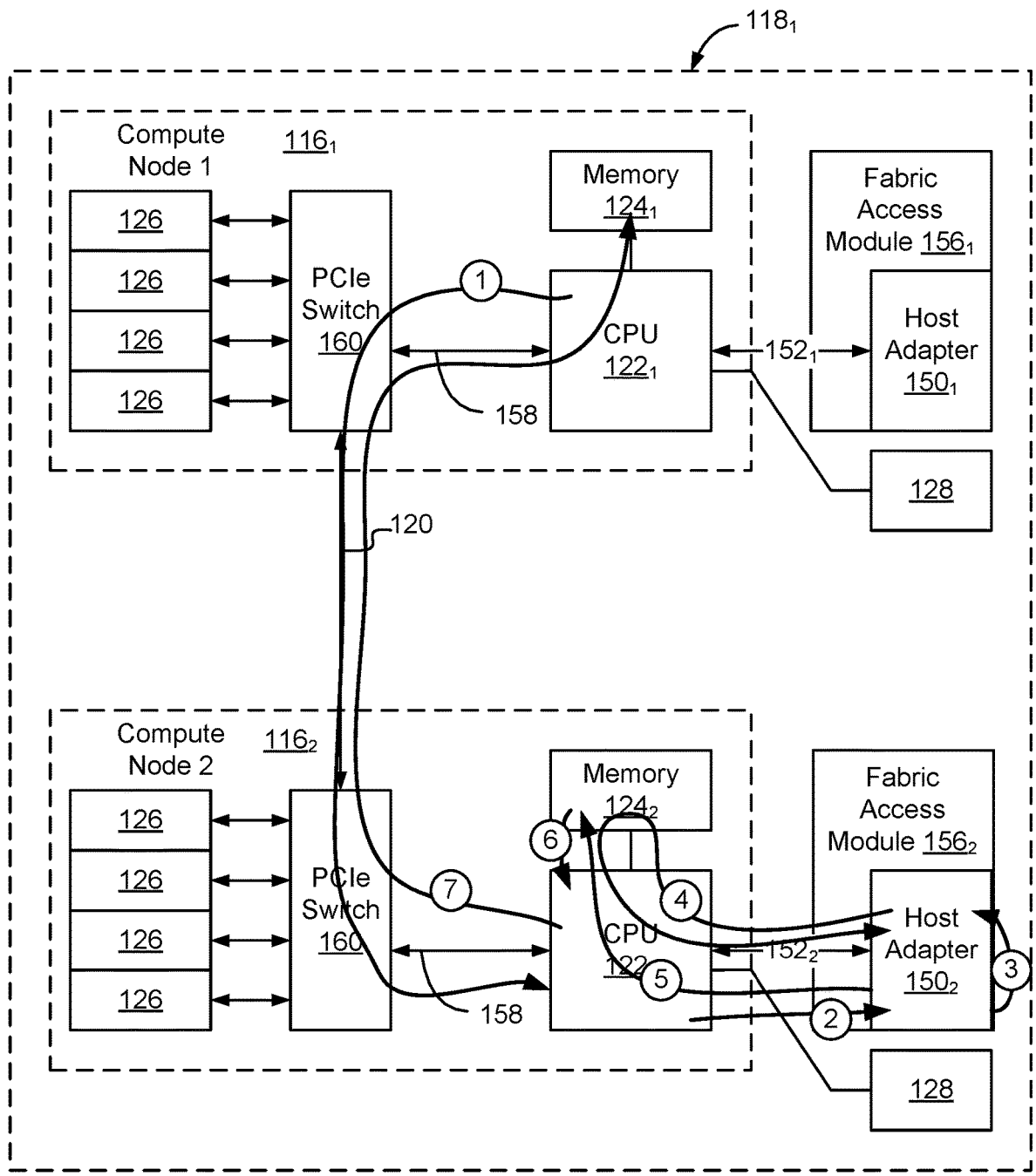
FIG. 6 is a functional block diagram of one of the storage engines of FIG. 2, showing a memory access operation by node 1 on a local memory of node 2, in which both node 1 and node 2 are contained in the same storage engine.

When a compute node 116 needs to access shared memory 124 (either its own memory or a memory of another compute node 116), all memory access operations are managed by the compute node's host adapter 150. Accordingly, if a compute node 116 needs to access its own memory 124, it implements the atomic operation through its host adapter. If the compute node 116 needs to access the memory 124 of another compute node 116, the atomic operation needs to occur on the host adapter of the other compute node 116. FIGS. 4-6 show several examples of how atomic operations are managed in an environment where each compute node is individually associated with a single host adapter.

FIG. 4 shows a local atomic operation by $CPU\ 122_1$ on its own memory $124_1$. Specifically, as noted above, in some implementations all atomic operations are managed by the compute node's host adapter 150. According, to implement a local atomic operation, the $CPU\ 122_1$ issues the atomic operation to host adapter $150_1$ (FIG. 4 arrow 1). Host adapter $150_1$ loops the request to itself, asking itself to perform the atomic operation and return the results (FIG. 4 arrow 2). Host adapter $150_1$ performs the atomic operation on memory $124_1$ (FIG. 4 arrow 3). Host adapter $150_1$ returns the result of the atomic operation through itself to memory $124_1$ (FIG. 4 arrow 4) and notifies $CPU\ 122_1$.

FIG. 5 shows an atomic operation by $CPU\ 122_1$ of compute node $116_1$ of storage engine $118_1$, to a memory $124_4$ of a compute node $116_4$ on storage engine $118_2$, in which storage engines $118_1$ and $118_2$ are directly connected (not connected by a fabric).

As shown in FIG. 5, the $CPU\ 122_1$ requests the fabric host adapter $150_1$ to perform an atomic operation on remote memory $124_4$ (FIG. 5 arrow 1). Host adapter $150_1$ issues the memory access to host adapter $150_4$ of compute node $116_4$ (FIG. 5 arrow 2) to ask host adapter $150_4$ to perform the atomic operation on memory $124_4$ and return the results. Host adapter $150_4$ performs the atomic operation on memory $124_4$ (FIG. 5 arrow 3). Host adapter $150_4$ returns the result through host adapter $150_1$ to memory $124_1$ (FIG. 5 arrow 4) and host adapter $150_1$ notifies $CPU\ 122_1$.

FIG. 6 shows another an atomic operation by $CPU\ 122_1$ of compute node $116_1$ to memory $124_2$ of compute node $116_2$ which is in the same storage engine $118_1$. As noted above, in some implementations all atomic operations are managed by the compute node's host adapter 150. Accordingly, host adapter $150_2$ is the entity that is required to implement an atomic operation on memory $124_2$. However, in an environment where storage engine $118_1$ is directly connected to storage engine $118_2$, there is no external connection between host adapter $150_1$ and $150_2$. While it would be possible to introduce a switch or use a fabric instead of the direct connections, doing so can increase the cost of scaling the storage system from one storage engine to two storage engines and, in some embodiments, is therefore undesirable.

Accordingly, as shown in FIG. 6, to implement an atomic operation on a memory of another compute node $116_2$ in the same storage engine $118_1$, the $CPU\ 122_1$ of the first compute node $116_1$ requests the $CPU\ 122_2$ in the second compute node $116_2$ to perform the atomic operation on its behalf (FIG. 6 arrow 1). In some embodiments this request is forwarded from $CPU\ 122_1$ to $CPU\ 122_2$ over communication link 120. $CPU\ 122_2$ in compute node $116_2$ issues the atomic operation to host adapter $150_2$ (FIG. 6 arrow 2). Host adapter $150_2$ loops the request to itself, asking itself to perform the atomic operation and return the results (FIG. 6 arrow 3). Host adapter $150_2$ performs the atomic operation on memory $124_2$ (FIG. 6 arrow 4). Host adapter $150_2$ returns the result of the atomic operation through itself to memory $124_2$ (FIG. 6 arrow 5) and notifies $CPU\ 122_2$. $CPU\ 122_2$ in compute node $116_2$ gets the atomic results from its memory $124_2$ (FIG. 6 arrow 6) and sends the results to node 1 (FIG. 6 arrow 7) and notifies $CPU\ 122_1$.

Accordingly, in an embodiment such as shown in FIGS. 4-6, where two storage engines are directly connected, each host adapter 150 has two external ports which allows point-to-point connection between that host adapter 150 and each of the compute nodes 116 of the other storage engine 118. Accordingly, a given compute node 116 is able to execute an atomic operation on itself (FIG. 4) or on one of the compute nodes 116 of the other storage engine 118 (FIG. 5). However, the compute node cannot reference memory coherently (reads, writes and atomic operations) with respect to operations initiated by the first node in the other compute node 116 of the same storage engine 118. To do so, the first compute node $116_1$ must signal to the second compute node $116_2$ that can use the host adapter $152_2$ to perform the action on its behalf. This uses compute resources and uses slow communication pathways impacting system performance and reducing the performance scaling from a single storage engine 118 to two storage engines 118. Additionally, the failure of a host adapter when only connected to one node of the storage engine will render that compute node unable to process 10s.

In some embodiments, as discussed below and as shown in FIGS. 7-12, a storage engine 118 of a storage system 100 is provided that has compute nodes 116 with redundant fabric access. In particular, each compute node 116 has access not only to its own fabric adapter 150, but to the fabric adapter 150 of the other compute node 116 contained in the storage engine 118.

The fabric adapters 150, in some embodiments, support multiple initiators on the PCI express (PCIe) ports connected to a processor root complex. Each upstream PCIe port internal to the adapter has access to both fabric ports. Further, the fabric ports implement a loop-back functionality where an operation that would logically exit a fabric port, but the destination on the fabric is the same port, will be looped back internally and not actually be sent out the fabric port. Incoming fabric operations are set up such that their destination is directed to one or the other of the upstream PCIe ports. In some embodiments, the storage engine 118 includes one host adapter per node, and one upstream PCIe port from each adapter is routed to the root complex of a first compute node 116 in the storage engine 118, and the other upstream PCIe port from each adapter 150 is routed to the root complex of the second node 116 in the storage engine 118.

When connected in this fashion, the first compute node $116_1$ in a storage engine $118_1$ can atomically read or write or perform atomic operations to the second compute node $116_2$ (and vice versa) in the same storage engine $118_1$ as well as perform these operations to itself. When the storage engine $118_1$ is connected to a second storage engine $118_2$, it likewise can also perform these same operations on the other 2 nodes in the second storage engine $118_2$ in the storage system 100. There is no need to send a message to a thread/process executing in the second compute node $116_2$ asking it to perform the operation atomically via the mentioned loop back function and then return the result back to compute node $116_1$, as shown in the example of FIG. 6.

Additionally, there is an improvement in system availability because each compute node 116 now has multiple paths to use to implement inter-node communications, therefore increasing the failure tolerance of the system. For example, in FIG. 5, since compute node $116_1$ has only one path to storage engine 2, a failure of fabric access module $156_1$ or host adapter $150_1$ will prevent compute node $116_1$ from being able to issue atomic operations on compute nodes $116_3$ and $116_4$. However, as discussed in greater detail below, if a dual ported host adapter 150 fails, the other host adapter 150 in the storage engine 118 is still available for all operations necessary from either compute node 116, thus increasing failure tolerance of the storage engine 118.

Figure 7:
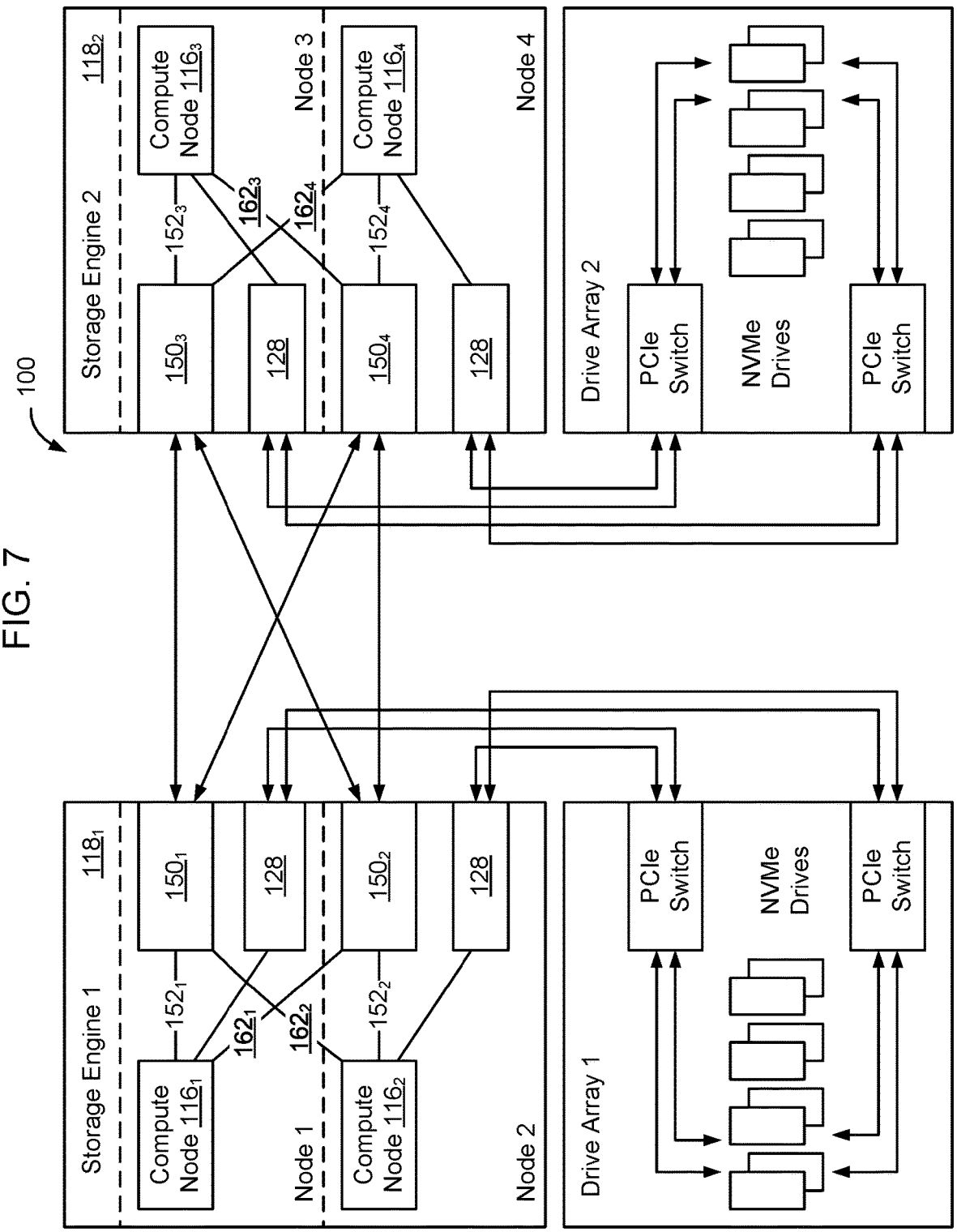
FIG. 7 is a functional block diagram of a storage system including two interconnected storage engines, each storage engine with a pair of compute nodes, in which each of the compute nodes in each of the storage engines has redundant fabric access.

FIG. 7 is a functional block diagram of a storage system 100 having a first storage engine $118_1$ interconnected with a second storage engine $118_2$, according to some embodiments of the present invention. As shown in FIG. 7, in addition to having the compute node $116_1$ connected to its own host adapter $150_1$, in some embodiments compute node $116_1$ is connected by PCIe bus $162_1$ to the host adapter $150_2$ of the other compute node $116_2$. Likewise, in addition to having the second compute node $116_2$ connected to its own host adapter $150_2$, compute node $116_2$ is connected by PCIe bus $162_2$ to the host adapter $150_1$ of the other compute node $116_1$. Similar connections $162_3$ $162_4$ are implemented in the second storage engine $118_2$ between compute node $116_3$ and host adapters $150_3$ and $150_4$, and between compute node $116_4$ and host adapters $150_3$ and $150_4$.

Figure 8:
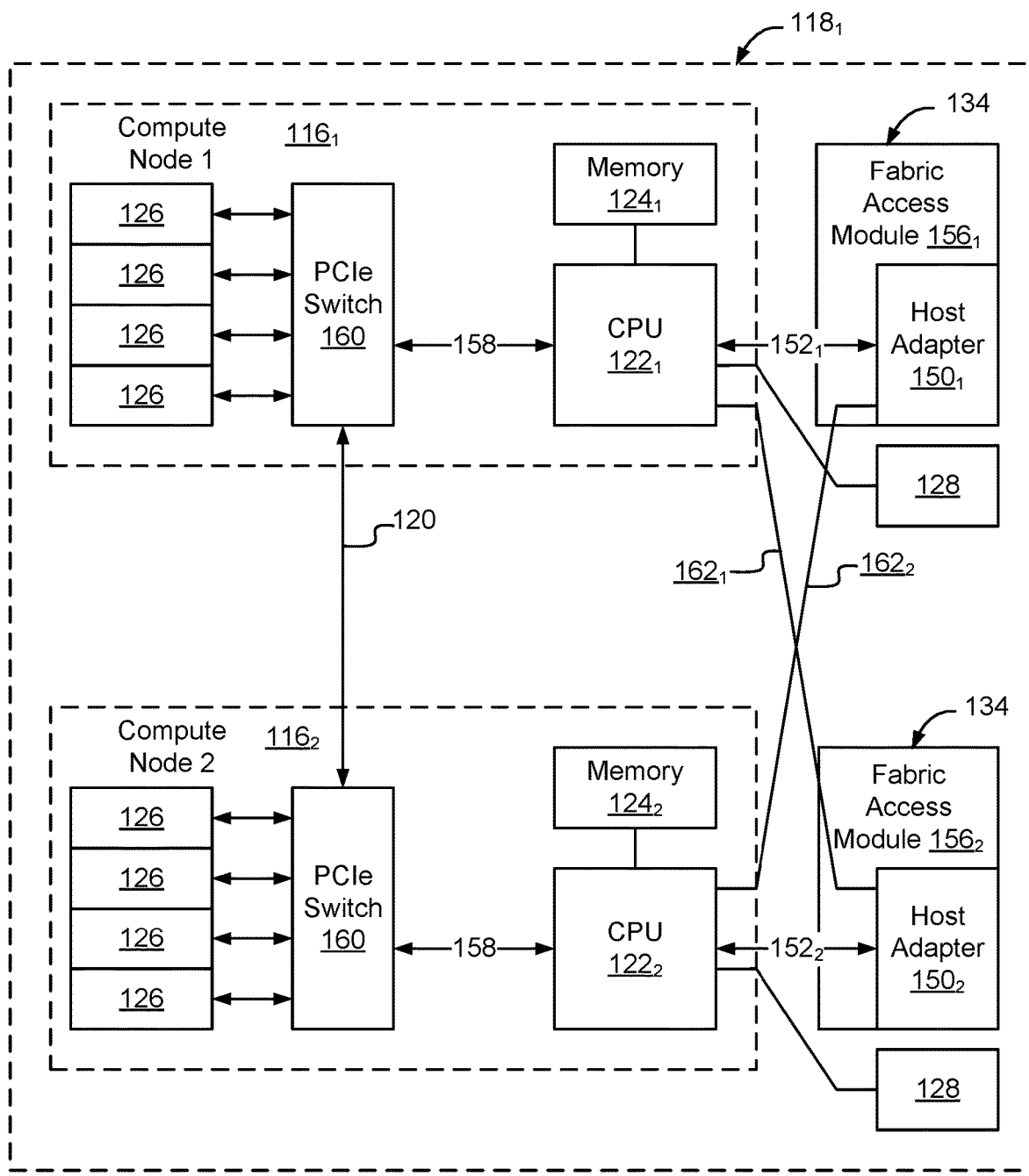
FIG. 8 is a functional block diagram of one of the storage engines of FIG. 7 in greater detail.

FIG. 8 is a functional block diagram of one of the storage engines $118_1$ of FIG. 7 showing the architecture of the storage engine $118_1$ in greater detail. As shown in FIG. 8, in some embodiments, each compute node 116 includes a CPU 122 and a set of front-end adapters 126. The CPU 122 and front-end adapters 126 may be interconnected, for example, using a PCIe switch 160. Local volatile memory 124 is connected to CPU 122. The CPU $122_1$ of compute node $116_1$ has a first connection $152_1$ to an associated fabric access module $156_1$ which includes host adapter $150_1$. Connection $152_1$, in some embodiments, is implemented using a PCIe bus. The CPU $122_1$ of compute node $116_1$ also has a second connection $162_1$ to a fabric access module $156_2$, which includes host adapter $150_2$, that is associated with compute node $116_2$. Connection $162_1$, in some embodiments, is implemented using a PCIe bus. By connecting both the host adapter $150_1$ associated with compute node $116_1$ and the host adapter $150_2$ associated with compute node $116_2$ to the PCIe root complex of compute node $116_1$, compute node $116_1$ is able to issue memory operations through either host adapter $150_1$, $150_2$.

Compute node $116_2$ is similarly configured such that CPU $122_2$ of compute node $116_2$ has a first connection $152_2$ to an associated fabric access module $156_2$ which includes host adapter $150_2$. Connection $152_2$, in some embodiments, is implemented using a PCIe bus. The CPU $122_2$ of compute node $116_2$ also has a second connection $162_2$ to a fabric access module $156_1$, which includes host adapter $150_1$, that is associated with compute node $116_1$. Connection $162_2$, in some embodiments, is implemented using a PCIe bus. By connecting both the host adapter $150_2$ associated with compute node $116_2$ and the host adapter $150_1$ associated with compute node $116_1$ to the PCIe root complex of compute node $116_2$, compute node $116_2$ is able to issue memory operations through either host adapter $150_2$, $150_1$.

Figure 9:
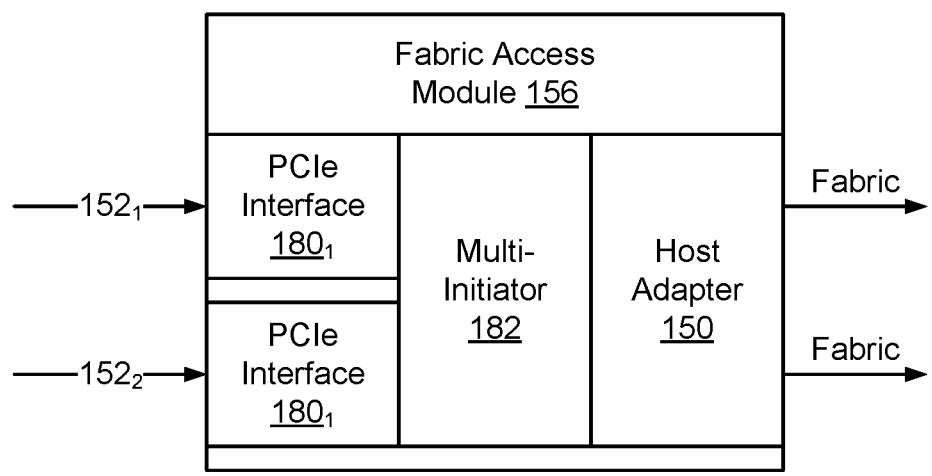
FIG. 9 is a functional block diagram of an example fabric access module according to some embodiments.

FIG. 9 is a functional block diagram of an example fabric access module 156 according to some embodiments. As shown in FIG. 9, in some embodiments the fabric access module 156 includes a first PCIe interface 1801, a second PCIe interface 1802, a multi-initiator module 182, and host adapter 150. As shown in FIG. 9, in some embodiments the host adapter 150 is configured to enable multi-initiating, such that multiple CPUs can initiate atomic operations on the host adapter 150 via multi-initiator module 182. The host adapter 150, in some embodiments, is configured to enable both compute nodes to initiate atomic operations on any connected memory 124. For example, referring to FIG. 8, compute node $116_1$ can initiate an atomic operation on its own memory $124_1$ using host adapter $150_1$, or can initiate an atomic operation on its own memory $124_1$ using host adapter $150_2$. Likewise, compute node $116_2$ can initiate an atomic operation on its own memory $124_2$ using host adapter $150_2$, or can initiate an atomic operation on its own memory $124_2$ using host adapter $150_1$. By enabling the host adapter to be multi-initiating, it becomes possible for each compute node $116_1$, $116_2$, to natively perform memory access operations on each memory $124_1$, $124_2$ of storage engine 118. In particular, memory access operations by one of the nodes on the memory of the other node do not require the other compute node to become involved in the memory access operation, thus greatly simplifying the memory access operation and improving the efficiency of the storage engine 118 and reducing latency in accessing data.

Figure 10:
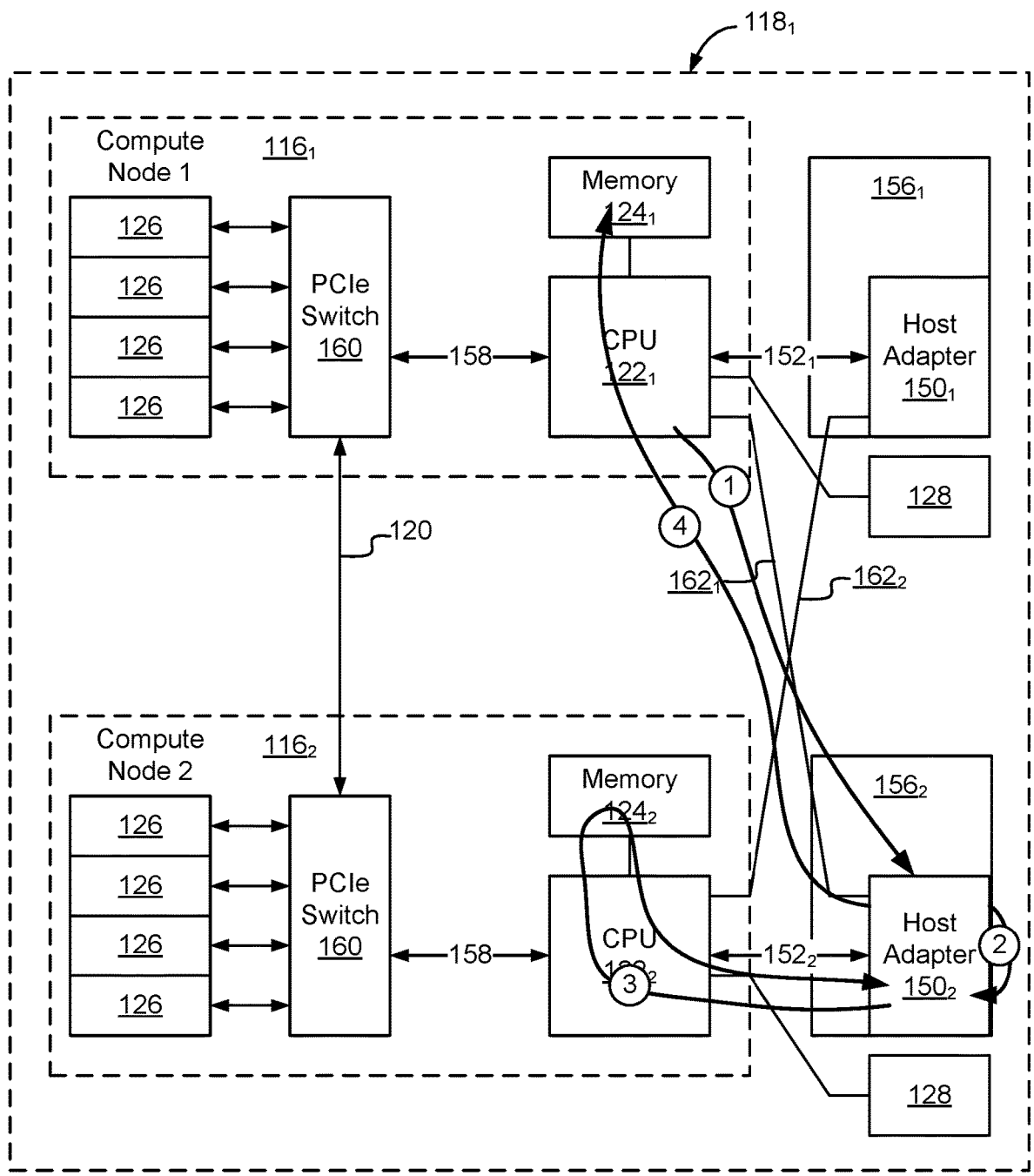
FIG. 10 is a functional block diagram of one of the storage engines of FIG. 7, showing a memory access operation by node 1 on a local memory of node 2, in which both node 1 and node 2 are contained in the same storage engine.
Figure 11:
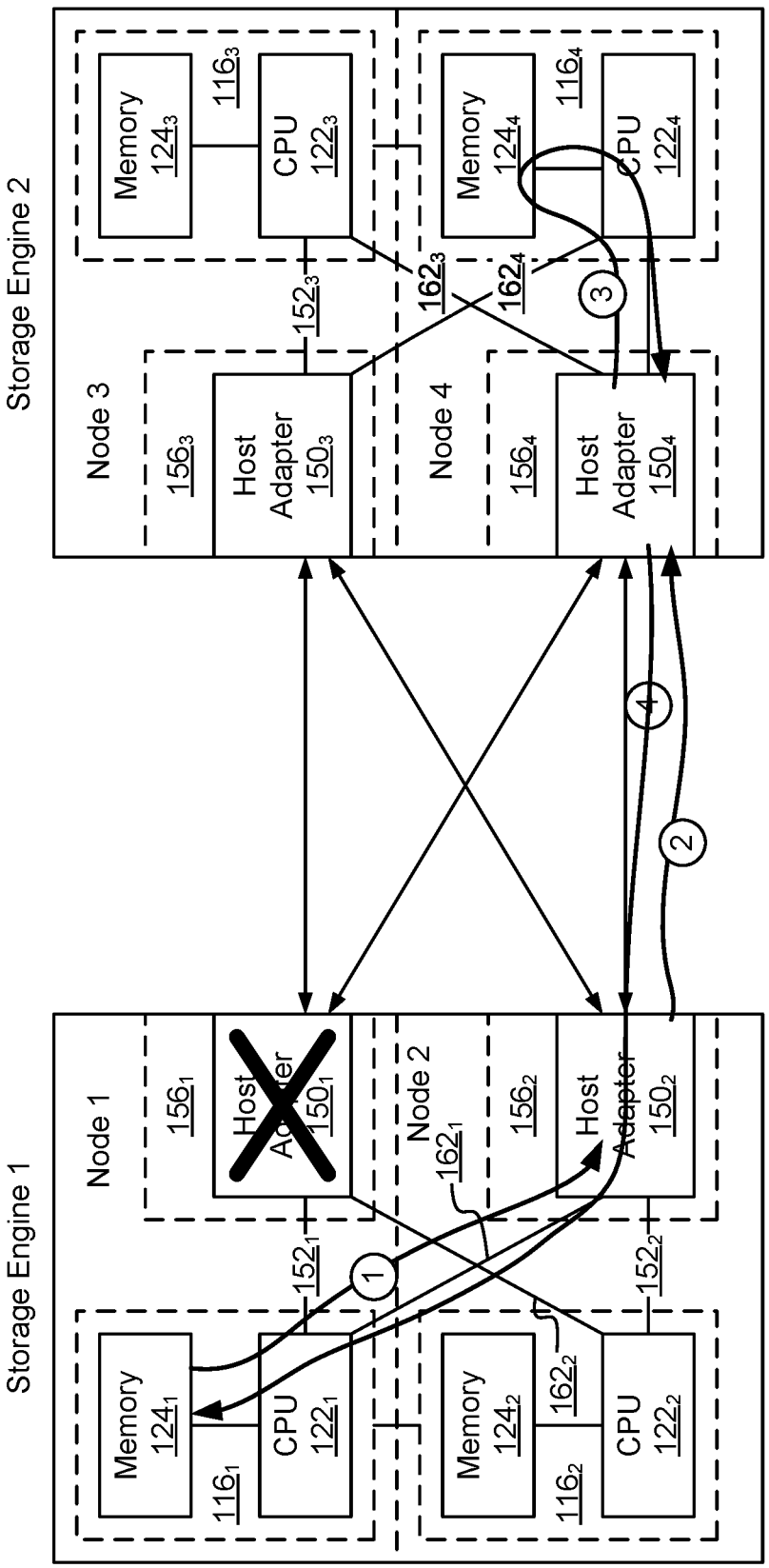
FIG. 11 is a functional block diagram of the two interconnected storage engines of FIG. 7 with redundant fabric access, showing operation of a memory access by node 1 on node 4 in the event of a failure of node 1's host adapter.
Figure 12:
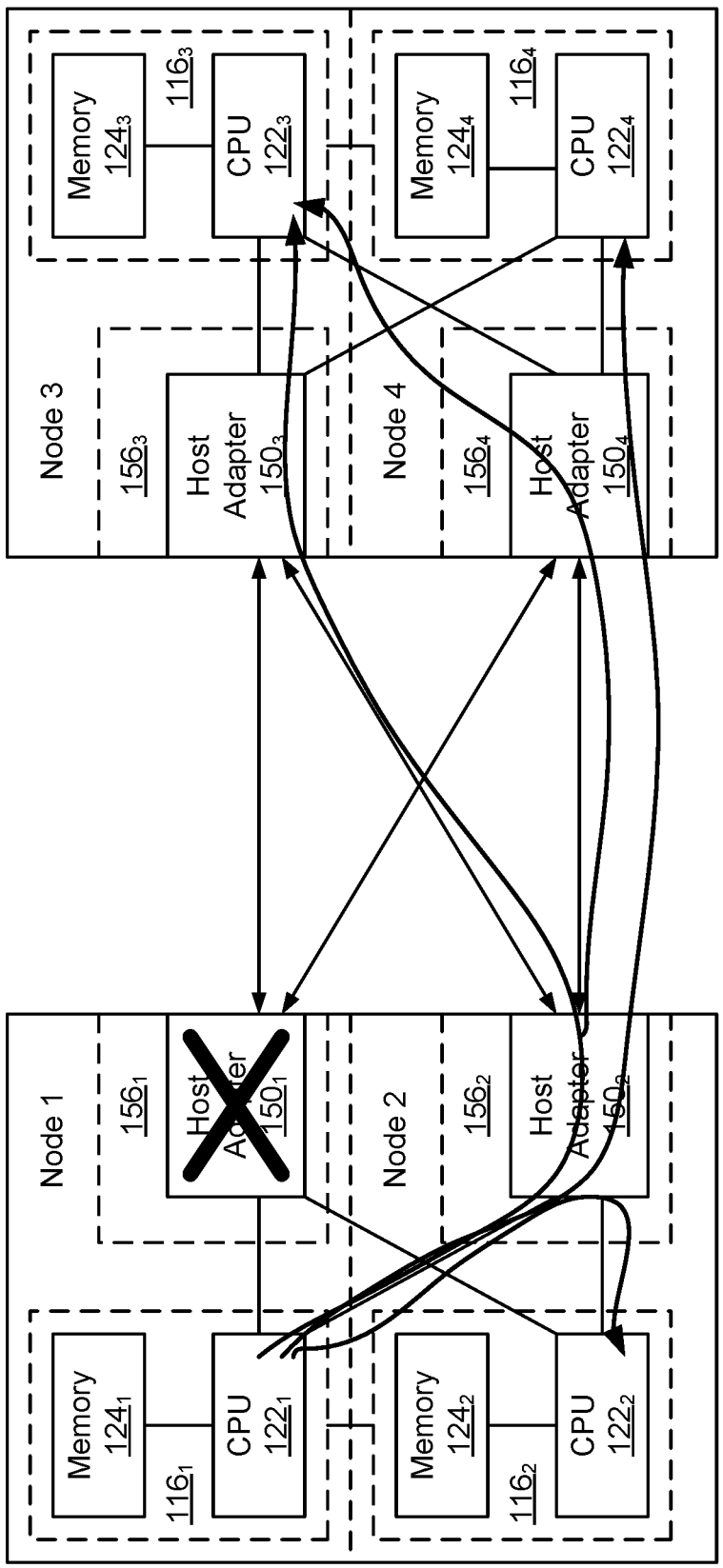
FIG. 12 is a functional block diagram of the two interconnected storage engines of FIG. 7 with redundant fabric access, showing operation of a memory access by node 1 on each of the other nodes in the event of a failure of node 1's host adapter.

FIGS. 10-12 show several examples of how atomic operations are implemented in an environment where each compute node is connected to each host adapter and the host adapters are multi-initiating.

FIG. 10 is a functional block diagram of one of the storage engines $118_1$ of FIG. 7, showing an atomic operation by compute node $116_1$ on memory $124_2$ of compute node $116_2$, which is part of the same storage engine $118_1$. As shown in FIG. 10, the CPU of compute node $116_1$ issues a request on PCIe bus $162_1$ to host adapter $150_2$, to instruct host adapter $150_2$ to perform an atomic operation on memory $124_2$ of compute node $116_2$ (FIG. 10, arrow 1). Host adapter $150_2$ loops the request to itself, asking itself to perform the atomic operation and return the results (FIG. 5 arrow 2). Host adapter $150_2$ performs the atomic operation on memory $124_2$ (FIG. 10 arrow 3). Host adapter $150_2$ returns the result of the atomic operation through itself to memory $124_1$ of compute node $116_1$ (FIG. 10 arrow 4) and notifies CPU $122_1$.

By including a PCIe bus $162_1$ between compute node $116_1$ and host adapter $150_2$, and by configuring host adapter $150_2$ to include multi-initiator 182 to allow multiple compute nodes to initiate atomic operations through host adapter $150_2$, it is possible to greatly simplify the manner in which atomic operations are implemented between compute nodes 116 of the same storage engine 118. Specifically, as shown in FIG. 6, if each compute node 116 is individually connected only to its respective host adapter 150, or if the host adapter 150 is not configured to include a multi-initiator, if a first compute node $116_1$ wanted to perform an atomic operation on a memory of the other compute node $116_2$ in the storage engine $118_1$, the first compute node $116_1$ was required to ask the CPU $122_2$ of the second compute node $116_2$ to implement the atomic operation. This increases the latency associated with implementing the atomic operation and consumed computational resources of the second CPU $122_2$. By enabling multiple compute nodes 116 to initiate atomic operations on a single host adapter 150, the process of implementing atomic operations is greatly simplified and accelerated because each compute node 116 can natively perform atomic operations on the memory 124 of the other compute node 116 without requiring involvement of the other compute node's CPU 122.

FIG. 11 is a functional block diagram of two interconnected storage engines 118 of FIG. 7, having compute nodes 116 with redundant connections to fabric access modules 156. FIG. 11 shows a memory access operation by compute node $116_1$, to memory $124_4$ of compute node $116_4$, in the event of a failure of compute node $116_1$'s host adapter $150_1$. As shown in FIG. 11, in some embodiments, each compute node $116_1$, $116_2$, is redundantly connected to both host adapters $150_1$, $150_2$. Additionally, as noted above, the host adapters are configured to enable the CPUs from multiple compute nodes 116 to initiate atomic operations on the host adapter 150. Accordingly, in the event of a failure of host adapter $150_1$, compute node $116_1$ is able to use host adapter $150_2$ to implement an atomic operation on memory $124_4$ of compute node 4. Likewise, (not shown), compute node 116 is also able to use host adapter $150_2$ to implement an atomic operation on its own memory $124_1$.

FIG. 12 is a functional block diagram of two interconnected storage engines of FIG. 7, having compute nodes 116 with redundant connections to fabric access modules 156. As shown in FIG. 12, the compute node $116_1$ is able to use host adapter $150_2$ to reach all other nodes of storage engine $118_1$ and storage engine $118_2$, even in the event of a failure of its own host adapter $150_1$.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A storage system, comprising:
a first storage engine having a first compute node, a second compute node, a first fabric access module, and a second fabric access module, the first compute node having a first CPU and associated first memory and the second compute node having a second CPU and associated second memory;
a first connection within the first storage engine between the first compute node and the first fabric access module;
a second connection within the first storage engine between the first compute node and the second fabric access module;
a third connection within the first storage engine between the second compute node and the first fabric access module; and
a fourth connection within the first storage engine between the second compute node and the second fabric access module;
wherein the first fabric access module contains a first multi-initiator module configured to enable both the first compute node and the second compute node to directly initiate atomic memory access operations on the first memory through the first fabric access module; and
wherein the second host adapter contains a second multi-initiator module configured to enable both the second compute node and the first compute node to directly initiate atomic memory access operations on the second memory through the second fabric access module.

2. The storage system of claim 1, wherein the first fabric access module contains a first host adapter configured to perform atomic operations on the first memory and the second memory; and wherein the second fabric access module contains a second host adapter configured to perform atomic operations on the second memory and the first memory.

3. The storage system of claim 1, wherein the first fabric access module has a first upstream PCIe port connected to a first PCIe root complex associated with the first CPU and first memory of the first compute node;

wherein the first fabric access module has a second upstream PCIe port connected to a second PCIe root complex associated with the second CPU and second memory of the second compute node;

wherein the second fabric access module has a third upstream PCIe port connected to the second PCIe root complex associated with the second CPU and second memory of the second compute node; and wherein the second fabric access module has a fourth upstream PCIe port connected to the first PCIe root complex associated with the first CPU and first memory of the first compute node.

4. The storage system of claim 1, wherein the first fabric access module includes a first PCIe interface connected to the first connection, a third PCIe interface connected to the third connection, and a first host adapter configured to enable the fabric access module to interconnect with a second storage engine; and wherein the second fabric access module includes a second PCIe interface connected to the second connection, a fourth PCIe interface connected to the fourth connection, and a second host adapter configured to enable the fabric access module to interconnect with a second storage engine.

5. The storage system of claim 1, further comprising:

a second storage engine having a third compute node, a fourth compute node, a third fabric access module, and a fourth fabric access module, the third compute node having a third memory and the fourth compute node having a fourth memory;

a fifth connection between the third compute node and the third fabric access module;

a sixth connection between the third compute node and the fourth fabric access module;

a seventh connection between the fourth compute node and the fourth fabric access module; and an eighth connection between the fourth compute node and the third fabric access module.

6. The storage system of claim 5, wherein the first fabric access module contains a first multi-initiator module configured to enable both the first compute node and the second compute node to initiate memory access operations on the third memory of the third compute node and the fourth memory of the fourth compute node through the first fabric access module; and wherein the second host adapter contains a second multi-initiator module configured to enable both the second compute node and the first compute node to initiate memory access operations on the third memory of the third compute node and the fourth memory of the fourth compute node through the second fabric access module.

7. The storage system of claim 6, wherein the first multi-initiator module is further configured to enable both the third compute node and the fourth compute node to initiate memory access operations on the first memory of the first compute node and the second memory of the second compute node through the first fabric access module; and wherein the second multi-initiator module is further configured to enable both the third compute node and the fourth compute node to initiate memory access operations on the second memory of the second compute node and the first memory of the first compute node through the second fabric access module.

8. The storage system of claim 6, wherein the first multi-initiator module is further configured to enable both the third compute node and the fourth compute node to initiate atomic memory operations on the first memory of the first compute node and the second memory of the second compute node through the first fabric access module; and wherein the second multi-initiator module is further configured to enable both the third compute node and the fourth compute node to initiate atomic memory operations on the second memory of the second compute node and the first memory of the first compute node through the second fabric access module.

9. The storage system of claim 5, wherein the first fabric access module contains a first multi-initiator module configured to enable both the first compute node and the second compute node to initiate atomic memory operations on the third memory of the third compute node and the fourth memory of the fourth compute node through the first fabric access module; and wherein the second host adapter contains a second multi-initiator module configured to enable both the second compute node and the first compute node to initiate atomic memory operations on the third memory of the third compute node and the fourth memory of the fourth compute node through the second fabric access module.

* * * * *